_(12)_ United States Patent
Berkhahn et al.

(10) Patent No.: US 9,071,455 B2
(45) Date of Patent: Jun. 30, 2015

(54) DEVICE AND METHOD FOR TRANSFERRING DATA VIA NODES OF A NETWORK

(75) Inventors: Sven-Olaf Berkhahn, Ohlendorf (DE); Martin Wagner, Hamburg (DE); Christoph Heller, Taufkirchen (DE); Stefan Schneele, Munich (DE)

(73) Assignee: Airbus Operations GmbH, Hamburg (DE)

( * ) Notice: Subject to any disclaimer, the term of this patent is extended or adjusted under 35 U.S.C. 154(b) by 330 days.

(21) Appl. No.: 13/458,221

(22) Filed: Apr. 27, 2012

(65) Prior Publication Data

US 2012/0278656 A1  Nov. 1, 2012

Related U.S. Application Data

(63) Continuation of application No. PCT/EP2010/066142, filed on Oct. 26, 2010.

(60) Provisional application No. 61/255,206, filed on Oct. 27, 2009.

(30) Foreign Application Priority Data

Oct. 27, 2009  (DE) .................. 10 2009 046 062

(51) Int. Cl.
*G06F 11/00* (2006.01)
*H04L 12/40* (2006.01)
(Continued)

(52) U.S. Cl.
CPC ........ *H04L 12/40169* (2013.01); *G06F 15/173* (2013.01); *H04L 12/40032* (2013.01); *H04L 2012/4028* (2013.01); *H04L 67/12* (2013.01)

(58) Field of Classification Search
CPC ..................................................... G06F 15/173
See application file for complete search history.

(56) References Cited

U.S. PATENT DOCUMENTS 6,094,682 A * 7/2000 Nagasawa .................. 709/224
6,175,865 B1   1/2001 Dove et al.
(Continued)

FOREIGN PATENT DOCUMENTS

DE  10 2006 004 191   8/2007
DE     102009001081   4/2010
(Continued)

OTHER PUBLICATIONS

German Office Action for Application Serial No. DE 102009046062 dated May 4, 2010.
(Continued)

*Primary Examiner* — Christopher McCarthy
(74) *Attorney, Agent, or Firm* — Jenkins, Wilson, Taylor & Hunt, P.A.

(57) ABSTRACT

The present invention provides for devices and methods for the transmission of data over nodes of a specific network. A device may comprise at least two network nodes, a bus having a transmitting line and a receiving line for interconnecting the network nodes. The respective network node has a fault protection circuit which is to bypass the network node in the event of a fault and is capable of reversing the polarity of the transmitting line and of the receiving line, a detection means for detecting a reverse in polarity of the transmitting line and of the receiving line by the respective upstream network node, and a fault-locating means for locating a fault in the upstream network node when a reverse in polarity of the transmitting line and of the receiving line has been detected.

14 Claims, 3 Drawing Sheets

(51) Int. Cl.
*G06F 15/173* (2006.01)
*H04L 29/08* (2006.01)

(56) References Cited

U.S. PATENT DOCUMENTS

| | | | |
|---|---|---|---|
| 7,460,469 | B2 * | 12/2008 | Goldberg et al. ............. 370/218 |
| 7,804,767 | B1 * | 9/2010 | Owens et al. ................ 370/217 |
| 2005/0065669 | A1 | 3/2005 | Roux et al. |
| 2008/0005310 | A1 | 1/2008 | Xu et al. |
| 2009/0323522 | A1 * | 12/2009 | Deguchi ....................... 370/228 |
| 2011/0255868 | A1 * | 10/2011 | Wu et al. ........................ 398/45 |

FOREIGN PATENT DOCUMENTS

| | | |
|---|---|---|
| WO | WO 00/29717 | 5/2000 |
| WO | WO 2009/003518 | 1/2009 |
| WO | WO 2011/051274 | 5/2011 |

OTHER PUBLICATIONS

International Search Report for Application Serial No. PCT/EP2010/066142 dated Feb. 3, 2011.

* cited by examiner

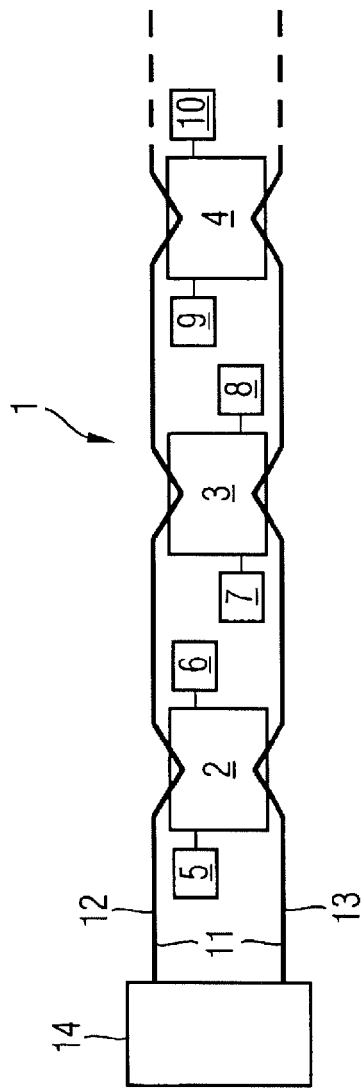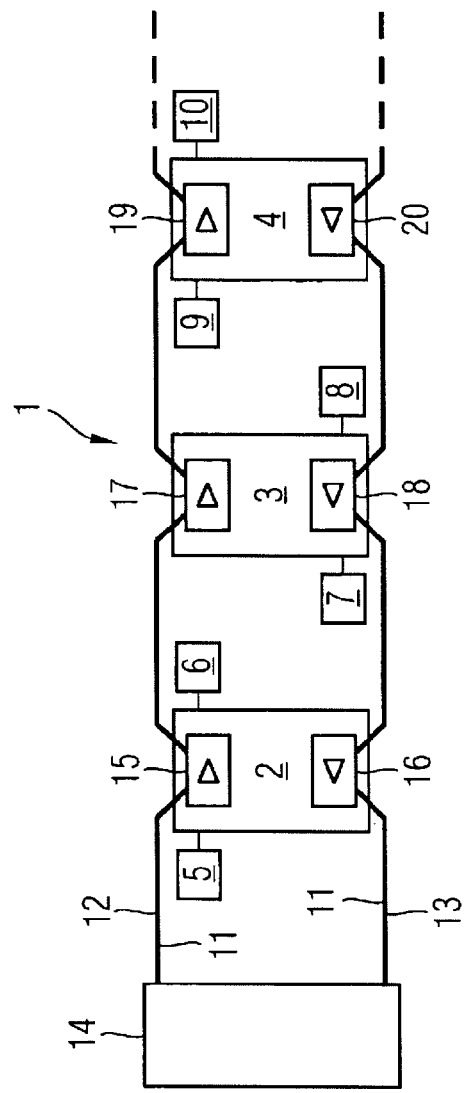
Fig. 1
Fig. 2

DEVICE AND METHOD FOR TRANSFERRING DATA VIA NODES OF A NETWORK

CROSS-REFERENCE TO RELATED APPLICATIONS

This application is a continuation of and claims priority to PCT/EP2010/066142 filed Oct. 26, 2010 which claims the benefit of and priority to U.S. Provisional Application No. 61/255,206, filed Oct. 27, 2009 and German Patent Application No. 10 2009 046 062.4 filed Oct. 27, 2009, the entire disclosures of which are herein incorporated by reference.

FIELD OF THE INVENTION

The present invention relates to a device and a method for the transmission of data over nodes of a specific network.

Although the present invention can be used in any field, it will be described in detail with respect to an aircraft or to a passenger aircraft.

The technical field of the invention relates to the transmission of data over nodes of a specific network in an aircraft, in particular in a cabin of an aircraft.

BACKGROUND OF THE INVENTION

In presently existing cabin management systems belonging to the Applicant, the so-called Cabin Intercommunication Data System (CIDS), a specific data bus, the so-called CIDS data bus, known internally to the Applicant, is used for the transmission of data, particularly for the transmission of safety-relevant data such as safety-relevant control and audio data, between a central controller and a plurality of terminals installed in the aircraft cabin.

The present CIDS data bus is based on the transmission of Ethernet frames and has a master or bus control device which is arranged in the central controller of the aircraft, and a plurality of network nodes, so-called decoder-encoder units (DEU) which can operate as the client.

Furthermore, the AFDX (Avionics Full Duplex) switched Ethernet data bus is being increasingly used in aircraft cabins for the transmission of safety-relevant data. This data bus is specified in the ARINC standard 664 and uses the IP protocol for data transmission.

The AFDX network topology consists of one or more switches to which the terminals are connected. Data is always transmitted between two terminals by at least one of these AFDX switches.

Document US 2005/0065669 A1 describes an aircraft control system for controlling the transmission of data via a CAN bus and an AFDX bus.

Document DE 10 2009 001 081 B3 describes a device and a method for transmitting data and energy over nodes of a specific network. The device has a least two arrangements, a bus with a transmitting line and a receiving line which interconnects the arrangements, and a bus control device which is coupled with the bus and has a first means configured for controlling a transmission of data defined according to the specific network, as data voltage signals over the transmitting line and over the receiving line, a second means configured for loading the data voltage signals on the transmitting line with first supply voltage signals suitable for the power supply of the arrangements of a first aircraft system, and a third means configured for loading the data voltage signals on the voltage line with second supply voltage signals suitable for the power supply of the arrangements of a second aircraft system.

WO 2009/003518 A1 describes a communications system and a method for controlling a communications system for the communication of audio data between a plurality of devices.

Document DE 10 2006 004 191 A1 describes a communications system with system subscribers and a bus, connecting said subscribers, for the exchange of data between the system subscribers, a central unit for the configuration of the communication between the subscribers being provided and the system subscribers being connected to the central unit by a control bus and a data bus; the central unit in the control bus connection being the sole transmitter and in the data connection being the sole receiver, and the bus access by the subscribers being controlled by means of the central unit so that data is transmitted from a subscriber via the data bus to the central unit and from there to the receiving system subscriber.

BRIEF DESCRIPTION OF THE INVENTION

The invention provides, in an exemplary embodiment, for a device for the transmission of data over nodes of a specific network which has the features of claim 1, and for a method for the transmission of data over nodes of a specific network which has the features of claim 14.

According thereto, a device for the transmission of data over nodes of a specific network of an aircraft is proposed which has at least two network nodes and a bus with a transmitting line and a receiving line for interconnecting the network nodes. The respective network node has a fault protection circuit for bypassing the network node in the event of a fault, which circuit is capable of reversing the polarity of the transmitting line and of the receiving line, a detection means for detecting a reverse in polarity of the transmitting line and of the receiving line by the respective upstream network node and a fault-locating means for locating a fault in the upstream network node when a reverse in polarity of the transmitting line and of the receiving line has been detected.

The respective means, the detection means, the fault-locating means and all means presented in the following can be implemented in terms of hardware or also in terms of both hardware and software. For a hardware implementation, the respective means can be configured as a device, for example as a computer or microprocessor, as a system or also as part of a system, for example as a computer system. For a software implementation, the respective means can be configured as a computer program product, as a function, as a routine, as part of a program code or as a realisable object.

Furthermore, an aircraft is proposed with a device, as described above, for the transmission of data over nodes of a specific network.

In addition, a method is proposed for the transmission of data over nodes of a specific network of an aircraft, which method has the following steps:

interconnection of at least two network nodes by means of a bus having a transmitting line and a receiving line, detection of the occurrence of a fault in a respective network node, bypassing of the network node in the event of a fault such that the transmitting line and the receiving line are reversed in polarity, detection of a reverse in polarity of the transmitting line and of the receiving line by the network node downstream of the bypassed network node, and location of a fault in the bypassed network node when a reverse in polarity of the transmitting line and of the receiving line has been detected.

An advantage of the present invention is that it is possible, in an economical and easily realisable manner, to locate a fault in a network of an aircraft.

If a network node detects the occurrence of a fault, for example failure of the power supply, then this network node is automatically bypassed by the fault protection circuit to directly transmit the received data to the network node connected downstream. Furthermore, the transmitting line and the receiving line of the bus are reversed in polarity by this fault protection circuit, i.e. they are cross-connected. This reverse in polarity can be detected by the network node downstream of the bypassed network node by the detection means. For this purpose, the detection means has an auto MDI-X algorithm, for example.

During said detection of a reverse in polarity, the fault-locating means of the downstream network node establishes that the upstream network node has a fault or is experiencing a fault. A fault in this upstream network node is thus located.

Furthermore, the detection means is configured to internally correct the reverse polarity or circuitry of the transmitting line and of the receiving line.

Advantageous configurations and improvements of the invention are provided in the subclaims.

According to a preferred development, a bus control device is provided. The bus control device has at least a first means which is configured to control a transmission of data defined according to the specific network as data voltage signals over the transmitting line and over the receiving line.

According to a further preferred development, the bus control device and the network nodes are coupled by the bus in a chain arrangement (daisy chain), the network nodes being coupled with the bus control device by the transmitting line of the bus and by the receiving line of the bus, the respective network node looping through the transmitting line and the receiving line.

According to a further preferred development, the respective network node has a switch arrangement for transmitting received data to the downstream network node, the fault protection circuit being configured to bypass the switch arrangement in the event of a fault and to reverse the polarity of the transmitting line and of the receiving line.

According to a further preferred development, the respective network node has a fault detection means which is configured to detect a fault during operation of the network node.

According to a further preferred development, the fault detection means controls the fault protection circuit by a first control signal, the fault detection means actively connecting the first control signal when there is no fault and inactively connecting the first control signal when a fault is detected or when the power supply fails.

According to a further preferred development, the fault protection circuit bypasses the switch arrangement in the case of an inactive first control signal to directly transmit the received data to the downstream network node. In a case of this type, the fault protection circuit reverses the polarity of the transmitting line and of the receiving line.

According to a further preferred development, the switch arrangement comprises the detection means. The detection means preferably has an auto MDI-X algorithm to detect a reverse in polarity of the transmitting line and of the receiving line. "MDI" stands for "Media Dependent Interface".

According to a further preferred development, at least one recognition means is provided for recognising the topology of the network in the bus control device or in at least one of the network nodes.

Due to an active interruption of the data transmission in the network, i.e. in each individual network node, a topology recognition and an automatic addressing of the network nodes can take place as follows.

When the network nodes are started in a specific maintenance mode for topology recognition, communication with the subsequent network nodes is initially interrupted in the respective network node, particularly in the Ethernet switch. The bus control device then gives an address to the network node which can be reached first of all. After the network node, reached first of all, has confirmed receipt of the address of the bus control device, communication with the next adjacent network node is cleared in the Ethernet switch of the network node. The next network node then automatically obtains an address through the bus control device and then clears the data traffic in the Ethernet switch. This takes place similarly for all further nodes of the network.

According to a further preferred development, the recognition means is configured to count the number of network nodes which are actually addressed and to compare this number with a desired value in the maintenance mode for addressing the network nodes by the bus control device. If the counted number of network nodes which are actually addressed is not the same as the desired value, then too few network nodes have been addressed and are thus active. Consequently, a fault is detected which can be located according to the invention.

According to a further preferred development, the bus control device has a second means which is configured to load the data voltage signals at least on the transmitting line or on the receiving line with supply voltage signals which are suitable for the power supply of at least one network node.

The second means preferably impresses the supply voltage signals on the transmitting line and on the receiving line.

In this respect, the second means of the bus control device is preferably powered from the emergency power supply of the aircraft so that even in the event of failure of the normal power supply or on-board power supply in the aircraft, the emergency power of the emergency power supply is available to the second means and thus the supply voltage signals can also be provided should the on board-power supply fail. The emergency power supply powers all the safety-relevant systems and instruments in the aircraft. The supply voltage signals are in this case loaded onto the data voltage signals and transmitted via the bus.

In the respective network node, the supply voltage signals and the data voltage signals can be separated by suitable arrangements or decoupling arrangements. The supply voltage signal, provided by the bus, can then be transmitted to the basic components in the network node, for example to the basic components of an amplifying arrangement or a selection of the coupled terminals which are required in particular for the data transmission and functionality of the data bus. Thus, if the normal aircraft voltage network or the on-board network fails or if the respective power pack of the network node fails, the basic components of the network node are still powered by the redundant power supply of the supply voltage signals and can thus still transmit data, particularly safety-critical data.

According to a further preferred development, the second means superimposes the data voltage signals provided by the first means on the supply voltage signals to form modulated voltage signals and couples the modulated voltage signals at least into the transmitting line.

According to a further preferred development, the respective network node has a decoupling arrangement which is configured to decouple the supply voltage signals from the modulated voltage signals transmitted by the bus.

According to a further preferred development, the respective network node has a coupling arrangement which is configured to couple the supply voltage signals, decoupled by the decoupling arrangement, into the bus for transmission to the respective downstream network node.

According to a further preferred development, the second means of the bus control device is coupled with an emergency energy supply of the aircraft for the supply of energy.

According to a further preferred development, the first means is configured to control a transmission of first frames, defined according to the specific network, with safety-relevant data and second frames with non-safety-relevant audio data in a predetermined sequence as the data voltage signals via the bus, to adjust a respective time interval of two first frames, each transmitted over the transmitting line, and of two first frames each transmitted over the receiving line, subject to a specific sampling rate of the audio data by the coupled terminals and to control a transmission of at least one respective second frame over the transmitting line and over the receiving line within the respective time interval.

An advantage of this development is that it is possible to provide a joint transmission of safety-relevant data with a fixedly defined time interval with minimal latency and minimal jitter and of non-safety-relevant data, such as IP data packets. In this respect, the second frames with the non-safety-relevant IP data packets are transmitted particularly in the best-effort method or mode. Furthermore, the real-time capability of the transmission of the first frames with the safety-relevant data is ensured by the use of a time slot method.

On account of the transmission of the first frames with the safety-relevant data and of the second frames with the non-safety-relevant data via a common hybrid data bus, it is not necessary to implement a data bus, parallel to the conventional CIDS bus, for the transmission of the IP packets. Consequently, it is possible to reduce weight and to make savings in costs and in the total outlay for the network of the aircraft. Furthermore, the costs for customised adaptations can be reduced, because only a single network has to be configured, not two networks, as was previously the case.

According to a further preferred development, the network nodes have respective amplifying arrangements for amplifying the signals on the transmitting line and on the receiving line, the second means forming supply voltage signals such that they are suitable for the power supply of the amplifying arrangements of the network nodes.

The network is preferably configured as an Ethernet network, in particular as a 100 Mbit/s Ethernet network. The network nodes are coupled to the conventional on-board power supply of the aircraft by means of plugs and cables.

BRIEF DESCRIPTION OF THE DRAWINGS

In the following, the invention will be described in detail on the basis of embodiments with reference to the accompanying figures of the drawings, in which:

FIG. 1 is a schematic block diagram of a first example of a device for transmitting data over nodes of a specific network;

FIG. 2 is a schematic block diagram of a second example of a device for transmitting data over nodes of a specific network;

In the figures, the same reference numerals denote the same or functionally identical components, unless indicated otherwise.

DETAILED DESCRIPTION OF THE INVENTION

Figure 3:
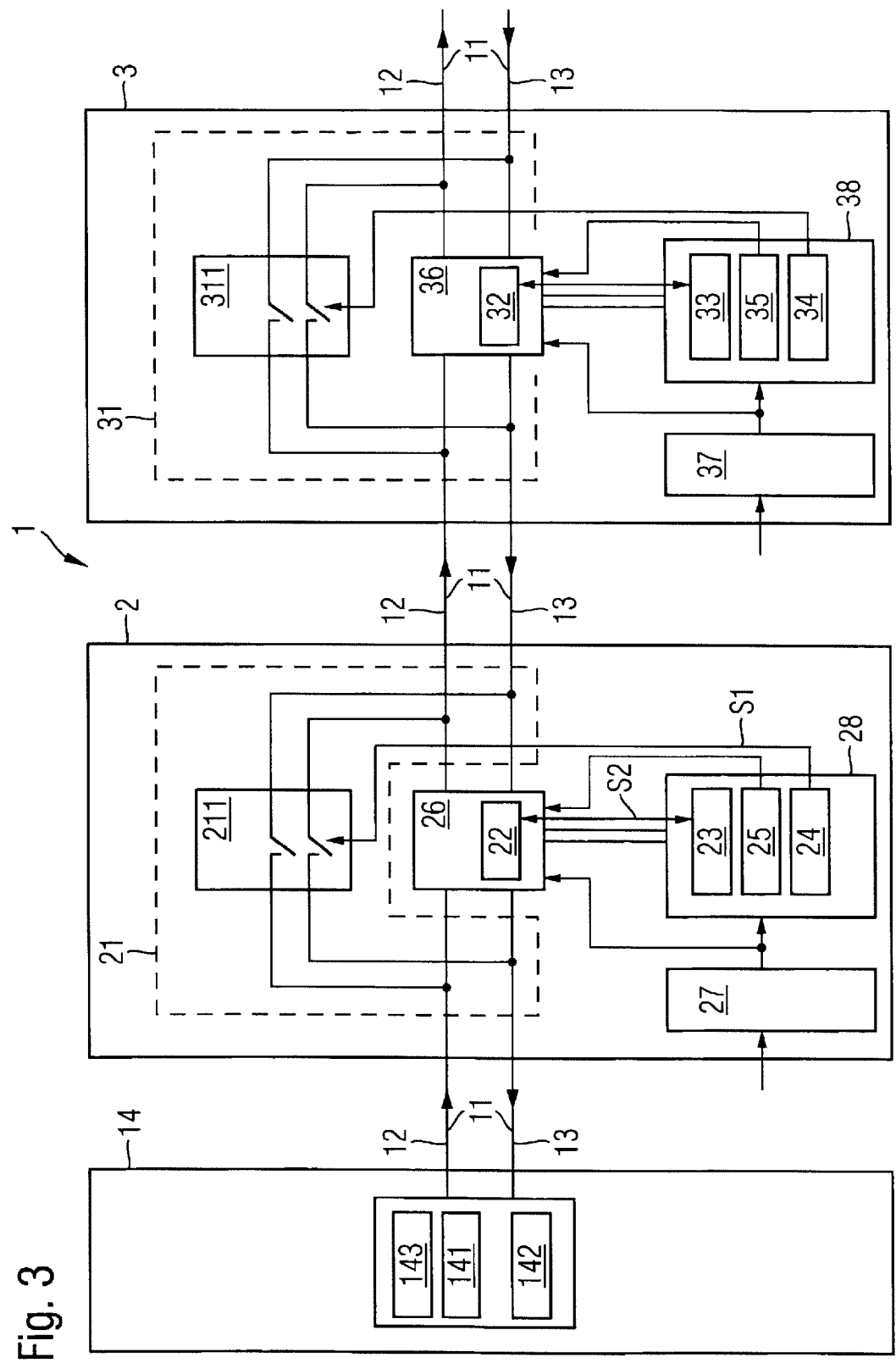
FIG. 3 is a schematic block diagram of an embodiment of a device for transmitting data over nodes of a specific network according to the invention.

FIG. 1 shows a schematic block diagram of an example of a device 1 for the transmission of data over network nodes 2-4. The network nodes 2-4 are coupled with a bus control device 14 by a bus 11. The bus 11 in this case has a transmitting line 12 and a receiving line 13. The transmitting line 12 and also the receiving line 13 are guided through the network nodes 2-4. One or more terminals 5-10 are coupled at each network node 2-4. In the embodiment according to FIG. 1, the non-safety-relevant terminals 5, 6 are coupled to the network node 2. In this respect, the bus 11 or the data bus is based on the physical 10 Mbit/s Ethernet layer. Channel access to the transmitting line 12 and to the receiving line 13 takes place by a statically a priori defined and deterministic time slot method which is controlled by the bus control device 14. The data for the terminals 5-10 coupled to the network nodes 2-4 is transmitted by frames or data frames in the time slots defined by the time slot method.

Apart from safety-relevant data, such as safety-relevant control data, a respective frame can also have non-safety-relevant audio data which is transmitted as a broadcast to all network nodes 2-4 coupled to the bus 11. In this respect, the time interval between two time slots is established such that it corresponds exactly to an inverse of the sampling rate of the audio data. Due to the construction of the CIDS data bus and to the setup of the statically a priori defined and deterministic time slot method which is used, the safety-relevant data is transmitted to all coupled terminals 5-10 with a high synchronicity and in a temporally deterministic manner with minimal latency. This is necessary in order to prevent Hall effects and echo effects during playback of the audio data over the numerous loudspeakers in the aircraft cabin. The data bus or bus 11 is also highly reliable, since the failure of individual network nodes 2-4 does not affect the transmission of data to the remaining network nodes, because the data lines, the transmitting line 12 and the receiving line 13 are looped through the network nodes 2-4 and are not guided through active driver modules.

FIG. 2 is a schematic block diagram of an example of a device 1 for transmitting data over network nodes 2-4 to illustrate the environment according to the invention.

The network nodes 2-4 are coupled with a respective number of terminals 5-10. Without restricting the generality, according to FIG. 2, the respective network nodes 2-4 are coupled with in each case two terminals 5-10. For example, network node 2 is coupled with terminals 5 and 6. The bus 11 for coupling the network nodes 2-4 with a bus control device 14 has a transmitting line 12 and a receiving line 13. The bus 11 couples the network nodes 2-4 in a chain arrangement (daisy chain). The network nodes 2-4 preferably loop through the transmitting line 12 and the receiving line 13. To strengthen the signals on the transmitting line 12 and on the receiving line 13, the respective network node 2-4 preferably has in each case an amplifying arrangement 15-20. The bus control device 14 is integrated particularly into the central control device of the aircraft. Furthermore, the bus control device 14 is integrated particularly into the central control device of the aircraft.

FIG. 3 is a schematic block diagram of an embodiment according to the invention of a device 1 for the transmission of data over network nodes 2, 3 of a specific network.

The device 1 is configured, for example, as a network and has a number of network nodes 2, 3 and a bus control device 14. The number of network nodes 2, 3 shown in FIG. 3 is purely an example.

The network nodes 2, 3 and the bus control device 14 are interconnected by a bus 11. The bus 11 has a transmitting line 12 for sending data and a receiving line 13 for receiving data.

The respective network node 2, 3 has at least one fault protection circuit 21, 31, one detection means 22, 32 and one fault-locating means 23, 33.

In the following, the mode of operation of the present invention will be described based on an example in which network node 2 has a fault or is experiencing a fault and network node 3 detects and locates said fault.

To detect a fault of this type, the respective network node has a fault detection means 24, 34. In the example described above, the fault detection means 24 of node 2 will detect the fault or the occurrence of a fault during operation of network node 2. Upon detection of said fault, the fault detection means 24 inactively connects a first control signal S1 to actuate the fault protection circuit 21.

When an inactive first control signal S1 is applied, the fault protection circuit 21 bypasses network node 2. A switchgear assembly 211 is used for this purpose. Furthermore, the fault protection means 21 reverses the polarity of the transmitting line 12 and of the receiving line 13.

The reverse in polarity of the transmitting line 12 and of the receiving line 13 is detected by the detection means 32 of the downstream node 3. The detection means 32 activates the fault-locating means 33 by means of a second control signal S2. As a result of this detection of the reverse in polarity of the transmitting line 12 and of the receiving line 13, the fault-locating means 33 of network node 3 locates a fault in the upstream n−1 bypassed network node 2. Furthermore, the bus control device 14 has a first means 141, a second means 142 and a recognition means 143. These means 141-143 are preferably part of microprocessor 140.

In this respect, the first means 141 is configured to control a transmission of data defined according to the specific network as data voltage signals over the transmitting line 12 and over the receiving line 13.

The bus 11 interconnects the bus control device 14 and the network nodes 2, 3 in a chain arrangement (daisy chain). The network nodes 2, 3 are coupled with the bus control device 14 by the transmitting line 12 and the receiving line 13. In this respect, the respective network node 2, 3 loops though the transmitting line 12 and the receiving line 13.

As stated above, the respective network node 2, 3 has a switch arrangement 26, 36 for transmitting received data to the downstream network node. The fault protection circuit 21, 31 is then configured to bypass the respective switch arrangement 26, 36 in the event of a fault.

Furthermore, the device 1 preferably comprises a recognition means 25, 35, 143 for recognising the topology of the network. For example, the bus control device 14 has a recognition means 143, network node 2 has a recognition means 25 and network node 3 has a recognition means 35.

The respective recognition means 25, 35, 143 is configured to count the number of actually addressed network nodes 2, 3 and to compare this number with a desired value in a maintenance mode for addressing the network nodes 2, 3 by the bus control device 14.

Figure 4:
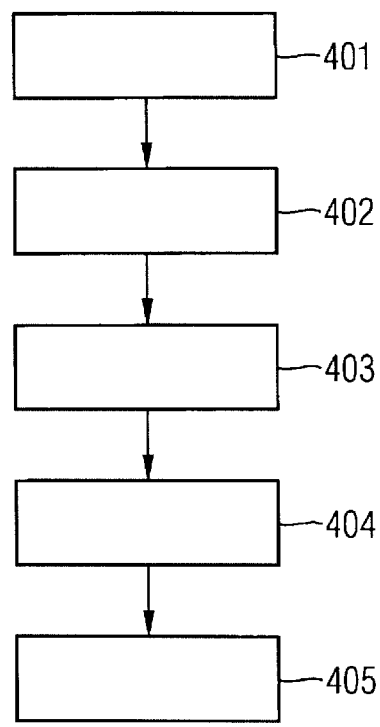
FIG. 4 is a schematic flow chart of an embodiment of a method for transmitting data over nodes of a specific network according to the invention.

FIG. 4 is a schematic flow chart of an embodiment of a method for transmitting data over nodes 2, 3 of a network.

The embodiment of the method of FIG. 4 comprises steps 401-405 and will be described with reference to FIG. 3.

Step 401

At least two nodes 2, 3 of a network are interconnected by a bus 11. The bus 11 has a transmitting line 12 and a receiving line 13 which are looped through by the respective network nodes 2, 3.

Step 402

When a fault occurs in one of the network nodes 2, 3, said fault or occurrence of a fault is detected.

Step 403

The network node 2, 3 at which the fault is detected, is bypassed such that the transmitting line 12 and the receiving line 13 are reversed in polarity.

Step 404

The reverse in polarity of the transmitting line 12 and of the receiving line 13 is detected by the network node 3 downstream of the bypassed network node 2.

Step 405

As a result of the detection of the reverse in polarity of the transmitting line 12 and of the receiving line 13, the downstream network node 3 detects and locates a fault in the bypassed network node 2.

Although the present invention has been described above on the basis of preferred embodiments, it is not restricted thereto, but can be modified in many different ways.

What is claimed is:

1. A device for the transmission of data over nodes of a specific network of an aircraft, comprising:
 a number of network nodes; and
 a bus having a transmitting line and a receiving line which interconnect the network nodes in a chain arrangement,
 each network node comprising: a fault protection circuit for bypassing the network node in the chain arrangement in the event of a fault,
 wherein the fault protection circuit is capable of cross-connecting the transmitting line and the receiving line,
 wherein each network node further comprises:
 a detection component for detecting a cross-connection of the transmitting line and of the receiving line by a network node upstream of the network node in the chain arrangement, and
 a fault-locating component for locating a fault in the network node upstream of the network node in the chain arrangement, when cross-connection of the transmitting line and of the receiving line has been detected.

2. The device according to claim 1, wherein a bus control device is provided which is configured to control a transmission of data, defined according to the specific network, as data voltage signals over the transmitting line and over the receiving line.

3. The device according to claim 2, wherein the network nodes are coupled with the bus control device by the transmitting line of the bus and by the receiving line of the bus, the network nodes looping through the transmitting line and the receiving line.

4. The device according to claim 2, wherein each of the network nodes has a switch arrangement for transmitting received data to the network node which is downstream in the chain arrangement, the fault protection circuit being configured to bypass the switch arrangement in the event of a fault.

5. The device according to claim 2, wherein the respective network node has a fault detection component which is configured to detect the occurrence of a fault during operation of the network node.

6. The device according to claim 5, wherein the fault detection component activates the fault protection circuit by a first control signal, the fault detection component actively connecting the first control signal when no fault is present and inactively connecting the first control signal when a fault has been detected or when the power supply fails.

7. The device according to claim 6, wherein the fault protection circuit bypasses the switch arrangement in the case of an inactive first control signal to directly transmit the received data to the downstream network node and, while doing so, cross-connects the transmitting line and the receiving line.

8. The device according to claim 2, wherein at least one recognition component for recognising the topology of the network is provided in the bus control device or in at least one of the network nodes.

9. The device according to claim 2, wherein the bus control device is configured to load the data voltage signals at least on the transmitting line or on the receiving line with supply voltage signals suitable for the power supply of at least one network node.

10. A device for the transmission of data over nodes of a specific network of an aircraft, comprising:
   a number of network nodes;
   a bus having a transmitting line and a receiving line which interconnect the network nodes in a chain arrangement; and
   a bus control device which is configured to control a transmission of data, defined according to the specific network, as data voltage signals over the transmitting line and over the receiving line;
   each network node comprising a fault protection circuit for bypassing the network node in the chain arrangement in the event of a fault,
   wherein the fault protection circuit is capable of cross-connecting the transmitting line and the receiving line, and in that each network node further comprises:
      a detection component for detecting a cross-connection of the transmitting line and of the receiving line by a network node upstream of the network node in the chain arrangement, and
      a fault-locating component for locating a fault in the network node upstream of the network node in the chain arrangement, when cross-connection of the transmitting line and of the receiving line has been detected;
   wherein each of the network nodes has a switch arrangement for transmitting received data to the network node which is downstream in the chain arrangement, the fault protection circuit being configured to bypass the switch arrangement in the event of a fault; and
   wherein the switch arrangement integrates the detection component, the detection component comprising an auto MDI-X algorithm for detecting a cross-connection of the transmitting line and of the receiving line.

11. A device for the transmission of data over nodes of a specific network of an aircraft, comprising:
   a number of network nodes;
   a bus having a transmitting line and a receiving line which interconnect the network nodes in a chain arrangement; and
   a bus control device which is configured to control a transmission of data, defined according to the specific network, as data voltage signals over the transmitting line and over the receiving line;
   each network node comprising a fault protection circuit for bypassing the network node in the chain arrangement in the event of a fault,
   wherein the fault protection circuit is capable of cross-connecting the transmitting line and the receiving line, and in that each network node further comprises:
      a detection component for detecting a cross-connection of the transmitting line and of the receiving line by a network node upstream of the network node in the chain arrangement, and
      a fault-locating component for locating a fault in the network node upstream of the network node in the chain arrangement, when cross-connection of the transmitting line and of the receiving line has been detected;
   wherein at least one recognition component for recognising the topology of the network is provided in the bus control device or in at least one of the network nodes; and
   wherein the recognition component is configured to count the number of network nodes which are actually addressed and to compare this number with a desired value in a maintenance mode for addressing the network nodes by the bus control device.

12. A device for the transmission of data over nodes of a specific network of an aircraft, comprising:
   a number of network nodes;
   a bus having a transmitting line and a receiving line which interconnect the network nodes in a chain arrangement; and
   a bus control device which is configured to control a transmission of data, defined according to the specific network, as data voltage signals over the transmitting line and over the receiving line;
   each network node comprising a fault protection circuit for bypassing the network node in the chain arrangement in the event of a fault,
   wherein the fault protection circuit is capable of cross-connecting the transmitting line and the receiving line, and in that each network node further comprises:
      a detection component for detecting a cross-connection of the transmitting line and of the receiving line by a network node upstream of the network node in the chain arrangement, and
      a fault-locating component for locating a fault in the network node upstream of the network node in the chain arrangement, when cross-connection of the transmitting line and of the receiving line has been detected;
   wherein the bus control device is configured to control a transmission of first frames, defined according to the specific network, with safety-relevant data and second frames with non-safety-relevant audio data in a predetermined sequence as the data voltage signals via the bus, to adjust a respective time interval of two first frames, each transmitted over the transmitting line, and of two first frames each transmitted over the receiving line, subject to a specific sampling rate of the audio data by the coupled terminals and to control a transmission of at least one respective second frame over the transmitting line and over the receiving line within the respective time interval.

13. A device for the transmission of data over nodes of a specific network of an aircraft, comprising:
- a number of network nodes;
- a bus having a transmitting line and a receiving line which interconnect the network nodes in a chain arrangement; and
- a bus control device which is configured to control a transmission of data, defined according to the specific network, as data voltage signals over the transmitting line and over the receiving line;
- each network node comprising a fault protection circuit for bypassing the network node in the chain arrangement in the event of a fault,
- wherein the fault protection circuit is capable of cross-connecting the transmitting line and the receiving line, and in that each network node further comprises:
  - a detection component for detecting a cross-connection of the transmitting line and of the receiving line by a network node upstream of the network node in the chain arrangement, and
  - a fault-locating component for locating a fault in the network node upstream of the network node in the chain arrangement, when cross-connection of the transmitting line and of the receiving line has been detected;
- wherein the bus control device is configured to load the data voltage signals at least on the transmitting line or on the receiving line with supply voltage signals suitable for the power supply of at least one network node; and
- wherein the network nodes have respective amplifying arrangements for amplifying the signals on the transmitting line and on the receiving line, the bus control device forming the supply voltage signals such that they are suitable for the power supply of the amplifying arrangements of the network nodes.

14. A method for the transmission of data over a number of nodes of a specific network of an aircraft, wherein the number of network nodes is coupled with a transmitting line and a receiving line by a bus in a chain arrangement, the method comprising:
- detecting the occurrence of a fault in a network node,
- bypassing the network node in which the fault has been detected, in the chain arrangement such that the transmitting line and the receiving line are cross-connected,
- detecting a cross-connection of the transmitting line and of the receiving line by the network node downstream of the bypassed network node in the chain arrangement, and
- locating a fault in the bypassed network node when a cross-connection of the transmitting line and of the receiving line has been detected.

* * * * *